W. G. DAUB.
GRAIN HARVESTING MACHINE.
APPLICATION FILED JUNE 25, 1913.

1,160,696.

Patented Nov. 16, 1915.
3 SHEETS—SHEET 1.

W. G. DAUB.
GRAIN HARVESTING MACHINE.
APPLICATION FILED JUNE 25, 1913.

1,160,696.

Patented Nov. 16, 1915.
3 SHEETS—SHEET 3.

Witnesses

Inventor
W. G. Daub
By
Attorneys

UNITED STATES PATENT OFFICE.

WADE G. DAUB, OF WESTERVILLE, OHIO.

GRAIN-HARVESTING MACHINE.

1,160,696.  Specification of Letters Patent.  Patented Nov. 16, 1915.

Application filed June 25, 1913. Serial No. 775,789.

*To all whom it may concern:*

Be it known that I, WADE G. DAUB, a citizen of the United States, residing at Westerville, in the county of Franklin, State of Ohio, have invented certain new and useful Improvements in Grain-Harvesting Machines; and I do hereby declare the following to be a full, clear, and exact description of the invention, such as will enable others skilled in the art to which it appertains to make and use the same.

This invention relates to grain harvesting machines.

The object of the invention resides in the provision of a machine which when moved along the ground will sever the standing grain and gather same in the form of a shock, said machine embodying means for delivering the gathered shock upon the ground when such shock becomes of the desired volume.

With the above and other objects in view the invention consists in the details of construction and in the arrangement and combination of parts to be hereinafter more fully described and particularly pointed out in the appended claim.

In describing the invention in detail reference will be had to the accompanying drawings wherein like characters of reference denote corresponding parts in the several views, and in which—

Figure 1:
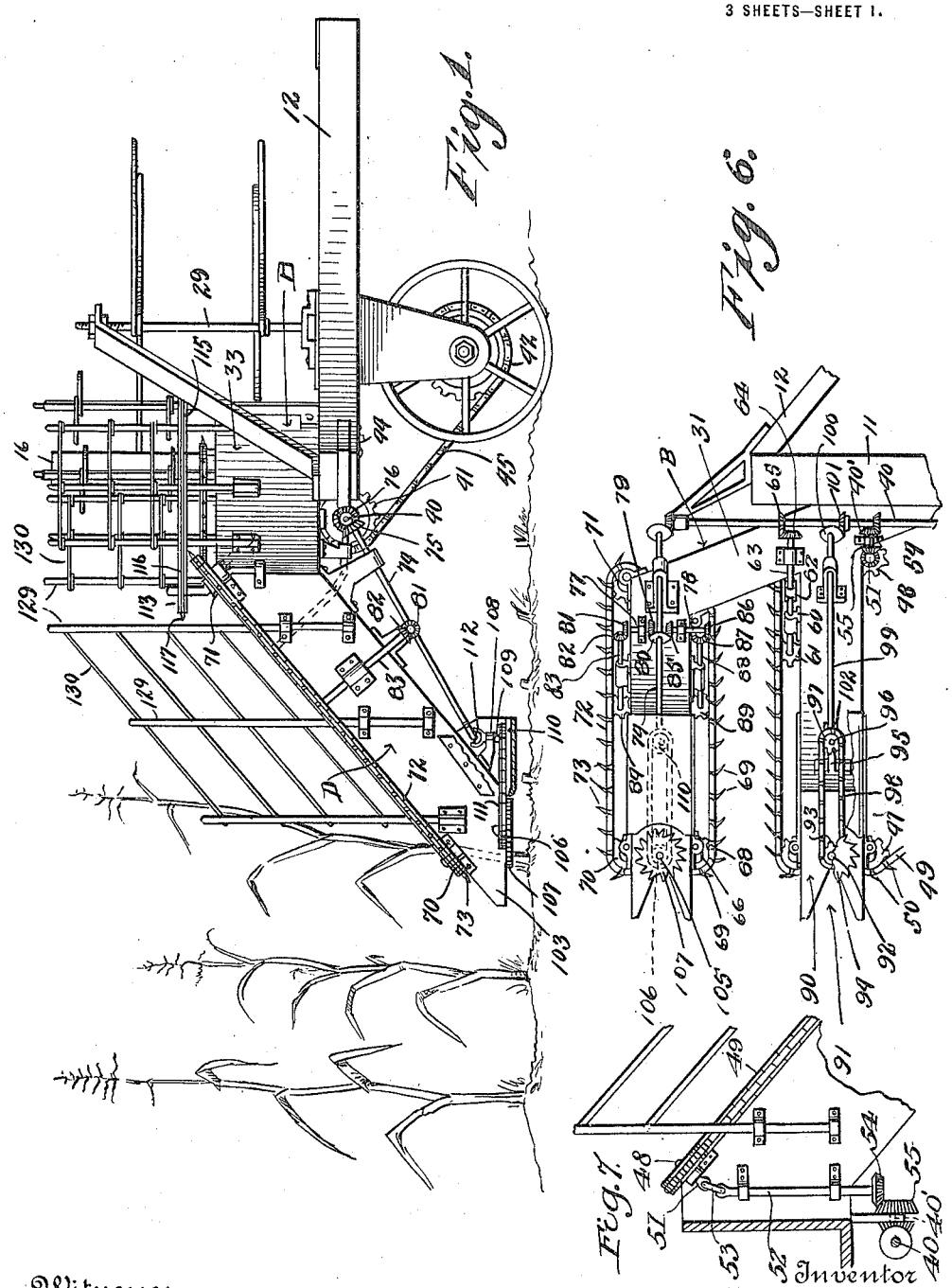
Figure 2:
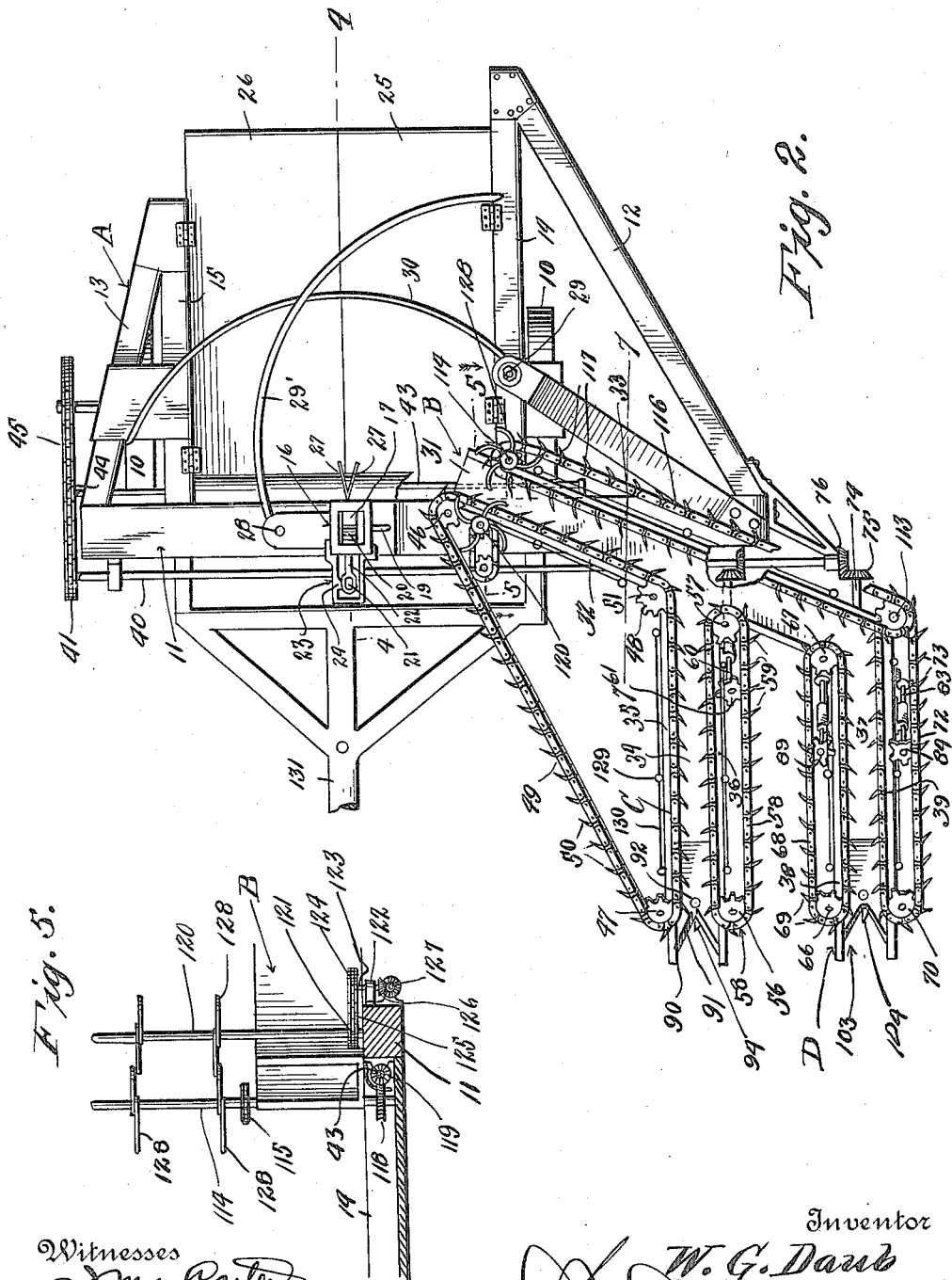
Figure 3:
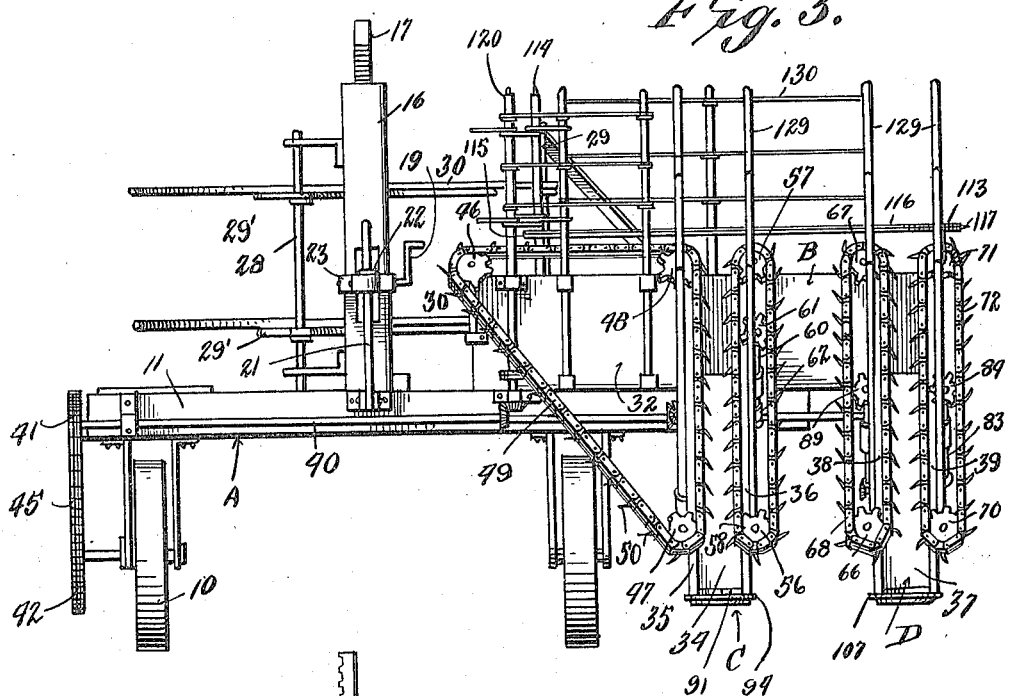
Figure 4:
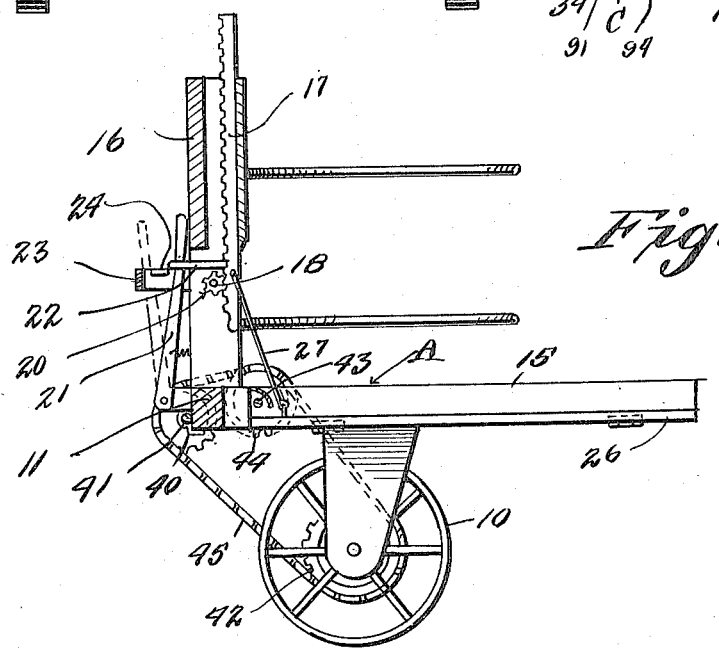

Figure 1 is a side elevation of a machine constructed in accordance with the invention; Fig. 2, a plan view of same; Fig. 3, a front elevation of the machine; Fig. 4, a section on the line 4—4 of Fig. 2; Fig. 5, a section on the line 5—5 of Fig. 2, Fig. 6, a bottom view of the forward portion of the machine, and Fig. 7, a section on the line 7—7 of Fig. 2.

Referring to the drawings the machine is shown as comprising a frame A supported upon wheels 10. This frame A includes a front sill 11 and rearwardly converging side members 12 and 13. Extending rearwardly from the sill 11 are parallel beams 14 and 15 the free ends of which are connected to the rear ends of the side members 12 and 13 respectively. Mounted upon the sill 11 is a vertical guide member 16 in which is arranged for vertical movement a rack bar 17. Journaled transversely of the guide member 16 is a shaft 18 provided at one end with a crank 19 and having fixed thereon within the guide member a pinion 20 which meshes with the rack bar 17 and whereby the rotation of the shaft 18 will raise and lower the rack bar 17. Pivoted to the sill 11 for movement in the same vertical plane as the guide member 16 is a lever 21 which carries a lateral arm 22 adapted to engage the teeth of the rack bar 17 to lock the latter against movement. Mounted upon the guide member 16 is a U-shaped plate 23 disposed in embracing relation to the lever 21 and having one of its arms provided with a lug 24 which acts as a stop to limit the movement of the lever 21 in one direction. Hinged to the beam 14 is a trap door 25, while a coöperating trap door 26 is hinged to the beam 15. These trap doors 25 and 26 are connected respectively to the lower end of the rack bar 17 by means of cables 27. By this construction it will be apparent that when the shaft 18 is rotated to elevate the rack bar 17 the trap doors 25 and 26 will be swung to horizontal or supporting position. When the trap doors are in this last named position the lever 21 is operated to move the arm 22 into engagement with the teeth of the rack bar 17 and thus lock the rack bar against descent and of course in turn lock the trap doors 25 and 26 in supporting position.

Rotatably mounted on the sill 11 between the guide member 16 and the beam 15 is a vertical shaft 28, while another vertical shaft 29 is rotatably mounted on the beam 14. Carried by the shaft 28 are laterally directed curved arms 29′, while laterally directed arms 30 are carried by the shaft 29. The arms 30 are curved oppositely to the arms 29′ and are disposed in intersecting relation to the latter the point of intersection of said arms moving toward the sill 11 as the shafts 28 and 29 are rotated in one direction and away from the sill 11 as said shafts are rotated in the opposite direction.

Supported upon the frame A at the junction of the sill 11 and the beam 14 is a trough B which includes a bottom 31 and side members 32 and 33. Supported by and connected with the trough B are forwardly directed downwardly inclined troughs C and D, the former including a bottom 34 and side members 35 and 36 and the latter including a bottom 37 and side members 38 and 39. Rotatably mounted in suitable brackets on the front side of the sill 11 is a drive shaft 40 which has fixed on the end thereof remote from the trough B a sprocket wheel 41 disposed in line with a sprocket wheel 42 fixed on an extension of the axle of the adjacent wheel 10. Journaled in suitable brackets on the rear side of the sill 11 is a shaft 43 which has fixed thereon a sprocket wheel 44 disposed in line with the sprocket wheels 41 and 42. Traveling on the sprocket wheels 41, 42 and 44 is a sprocket chain 45. By this construction it will be apparent that as the machine is moved along the ground the rotation of the sprocket wheel 42 under the influence of the rotation of the axle of the wheel 10 will in turn effect the rotation of the shafts 40 and 43.

Journaled on the inner end of the side member 32 of the trough B is a sprocket wheel 46, while a sprocket wheel 47 is journaled on the side member 35 of the trough C. Another sprocket wheel 48 is journaled at the junction of the side members 32 and 35 of the troughs B and C respectively. Traveling on the sprocket wheels 46, 47 and 48 is an endless sprocket chain 49 provided with teeth 50 which are directed inwardly of the troughs B and C during the travel of the sprocket chain 49. It will be noted that the sprocket wheel 48 is fixed upon a rotatable shaft 51 and this last named shaft is connected to a shaft 52 by means of a universal joint 53. Fixed on the shaft 52 is a beveled gear 54 which meshes with a beveled gear 55 fixed on the shaft 40' and whereby the rotation of the shaft 40 will effect a rotation of the sprocket wheel 48 and the desired movement of the sprocket chain 49. Journaled on the side member 36 of the trough C on the outer end of the latter is a sprocket wheel 56 while another sprocket wheel 57 is rotatably mounted at the junction of the side member 36 and the side member 32. Traveling on the sprocket wheels 56 and 57 is a sprocket chain 58 provided with teeth 59 which are directed inwardly of the trough C during the movement of the chain 58. Rotatably mounted on the side member 36 of the trough C is a shaft 60 which has fixed thereon a sprocket wheel 61 operatively engaging the sprocket chain 58. This shaft 60 is connected by a universal joint 62 to a shaft 63 rotatably mounted on the bottom 31 of the trough B. Fixed on the shaft 63 is a beveled gear 64 which meshes with a beveled gear 65 fixed on the shaft 40 and whereby the rotation of the shaft 40 will effect the desired movement of the sprocket chain 58.

Journaled on the side member 38 of the trough D is a sprocket wheel 66, while another sprocket wheel 67 is rotatably mounted at the junction of the side members 38 and 32. Traveling on the sprocket wheels 66 and 67 is a sprocket chain 68 provided with teeth 69 which are directed inwardly of the trough D during the movement of the chain 68. Journaled on the side member 39 of the trough D on the outer end of said side member is a sprocket wheel 70, while a sprocket wheel 71 is rotatably mounted at the junction of the side member 33 and side member 39. Traveling on the sprocket wheels 70 and 71 is a chain 72 which has formed thereon teeth 73 disposed inwardly of the trough D during the movement of the chain 72. Journaled on the bottom 31 of the trough B and extending longitudinally of the trough D is a shaft 74 which has fixed on one end thereof a beveled gear 75 meshing with a beveled gear 76 fixed on the shaft 40. Journaled transversely of the trough D on the bottom of the latter are alined shafts 77 and 78. The shaft 77 has fixed on the inner end thereof a beveled gear 79 which meshes with a beveled gear 80 fixed on the shaft 74. Fixed on the outer end of the shaft 77 is a beveled gear 81 which meshes with a beveled gear 82 fixed on a shaft 83 journaled on the side member 39 of the trough D. Fixed on the upper end of the shaft 83 is a sprocket wheel 84 which operatively engages the sprocket chain 72. Fixed on the inner end of the shaft 78 is a beveled gear 85 which meshes with the beveled gear 80 on the shaft 74. Fixed on the outer end of the shaft 78 is a beveled gear 86 which meshes with a beveled gear 87 fixed on a shaft 88, said shaft being journaled on the side member 38 of the trough D. Fixed on the upper end of the shaft 88 is a sprocket wheel 89 which operatively engages the sprocket chain 68.

The bottom 34 of the trough C terminates at its outer end in an angularly disposed portion 90 having a recess 91 formed therein. Rotatably mounted in the angularly disposed portion 90 is a vertical shaft 92 which has fixed thereon a sprocket wheel 93 and beneath said sprocket wheel a rotary cutter 94. Mounted on the bottom 34 of the trough C is a bracket 95 in which is journaled a vertical shaft 96 having fixed on the lower end thereof a sprocket wheel 97. Traveling on the sprocket wheels 93 and 97 is a sprocket chain 98. Journaled on the bottom 34 of the trough C is a longitudinal shaft 99 one end of which has fixed thereon a beveled gear 100 which meshes with a beveled gear 101 fixed on the shaft 40. The end of the shaft 99 remote from the gear 100 is connected to the upper end of the shaft 96 by means of a universal joint 102.

The bottom 37 of the trough D terminates at its outer end in an angular portion 103 provided with a recess 104. Journaled in the angular portion 103 is a vertical shaft 105 which has fixed thereon a sprocket wheel 106 and a rotary cutter 107 said rotary cutter being disposed beneath the sprocket wheel 106. Mounted upon the bottom 37 of the trough D is a bracket 108 in which is journaled a vertical shaft 109. Fixed on the lower end of this shaft 109 is a sprocket wheel 110 and traveling on these sprocket wheels 106 and 110 is a sprocket chain 111. The upper end of the shaft 109 is connected to the adjacent end of the shaft 74 by a universal joint 112. Rotatably mounted at the junction of the side members 39 and 33 on the same shaft as the sprocket wheel 71 is a sprocket wheel 113. Rotatably mounted at the inner end of the side member 33 of the trough B is a vertical shaft 114 which has fixed thereon a sprocket wheel 115. Traveling on the sprocket wheel 113 and the sprocket wheel 115 is a sprocket chain 116 provided with teeth 117 disposed inwardly of the trough B during the travel of the chain 116. Fixed on the lower end of the shaft 114 is a worm wheel 118 which meshes with a worm 119 fixed on the shaft 43. Rotatably mounted on the inner end of the side member 32 of the trough B is a vertical shaft 120 which has fixed on the lower end thereof a sprocket wheel 121. Rotatably mounted in a bracket 122 on the front side of the sill 11 is a vertical shaft 123 which has fixed on its upper end a sprocket wheel 124 disposed in line with the sprocket wheel 121 and traveling on the sprocket wheels 121 and 124 is a sprocket chain 125. Fixed on the lower end of the shaft 123 is a beveled gear 126 which meshes with a beveled gear 127 fixed on the shaft 40. The shafts 120 and 114 are provided respectively with thrust fingers 128 for a purpose that will presently appear. Mounted upon the side members of the various troughs B, C and D are uprights 129 connected together by strands of wire 130, said uprights and strands of wire constituting a guide to support the grain against tendency to fall laterally during the passage of the grain through the various troughs. Secured to the sill 11 is a draft pole 131 whereby the desired draft animals may be attached to the machine for the purpose of drawing same along the ground.

In the operation of the machine it will be obvious that as the machine is drawn along the ground the cutters 94 and 107 will be rotated so that as the grain passes into the recesses 91 and 104 it will be severed by said cutters. The severed grain will then be engaged by the teeth of the various sprocket chains and moved through the troughs C and D and thence through the trough B. As this grain reaches the end of the trough B the thrust fingers 128 will operate to throw same sharply against the arms 29' and 30 which arms will support the grain in an upright position, the trap doors 25 and 26 having been previously locked in supporting position. As the grain is delivered from the inner end of the trough B it will gradually spread the arms 29' and 30. As soon as the shock of grain is of sufficient volume the lever 21 is operated to withdraw the arm 22 from engagement with the teeth of the rack bar 17 when the trap doors 25 and 26 will move downwardly at their free ends and deposit the shock of grain upon the ground. This operation is repeated as the machine progresses.

What I claim is:—

In a grain harvesting and shock forming machine, the combination of a wheeled frame, trap doors hinged on said frame, a vertical guide member carried by the frame, a rack bar mounted for sliding movement in the guide member, a shaft rotatably mounted on the guide member, a pinion on said shaft coöperating with the rack, means for rotating said shaft, connections between the rack bar and each trap door whereby the movement of said rack bar upwardly a predetermined distance will dispose the trap doors in horizontal position, releasable means for supporting the cut grain in vertical position on the trap doors, and means for locking the rack bar against vertical movement.

In testimony whereof, I affix my signature, in the presence of two witnesses.

WADE G. DAUB.

Witnesses:
BERNICE SPOHN,
ANNA SPOHN.